UNITED STATES PATENT OFFICE.

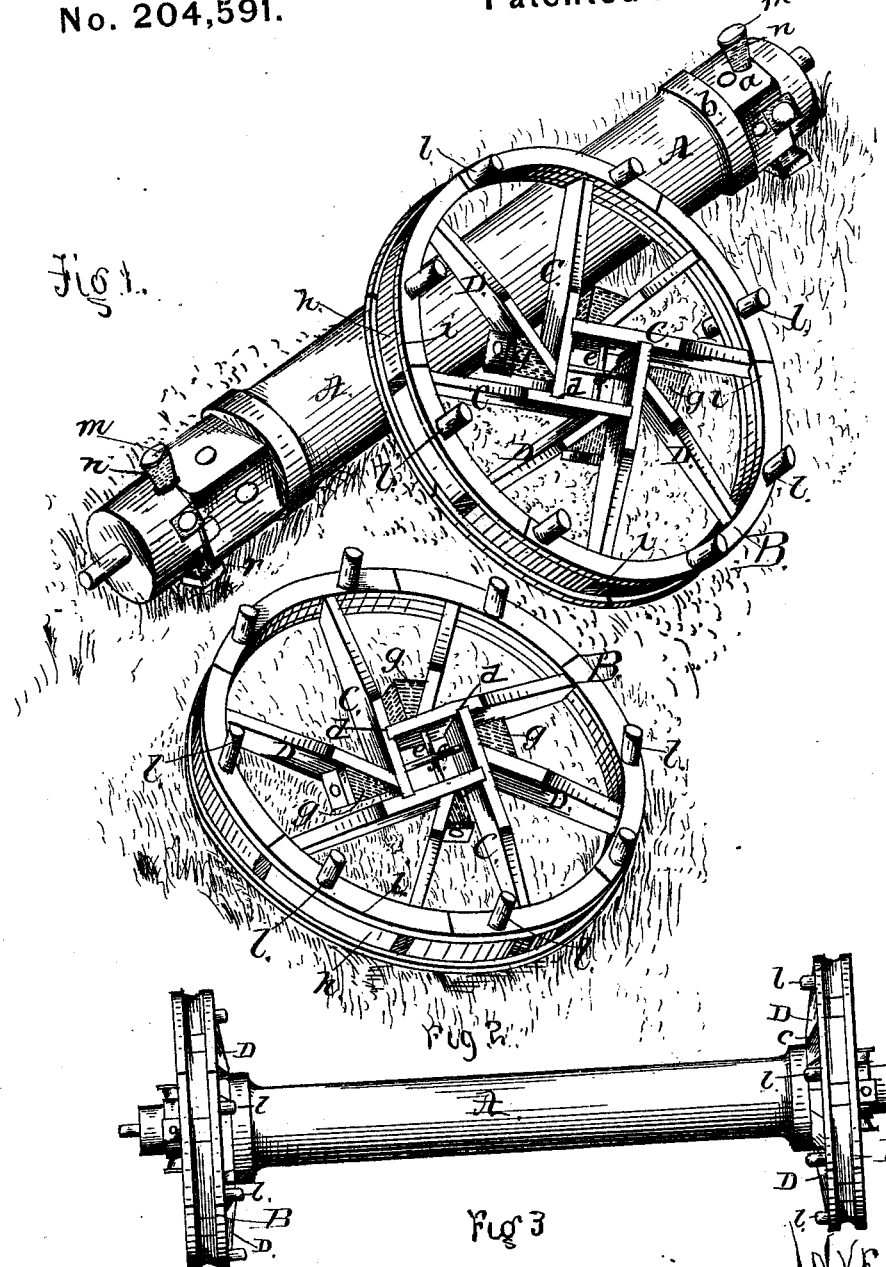

MICHAEL B. McMANUS, OF TITUSVILLE, PENNSYLVANIA.

IMPROVEMENT IN BULL-WHEELS FOR ARTESIAN WELLS.

Specification forming part of Letters Patent No. 204,591, dated June 4, 1878; application filed February 19, 1878.

*To all whom it may concern:*

Be it known that I, MICHAEL B. MCMANUS, of Titusville, in the county of Crawford and State of Pennsylvania, have invented a new and useful Improvement in Bull-Wheels for Artesian Wells, of which the following is a specification, reference being had to the accompanying drawings.

The invention relates to an improvement upon the bull-wheel for Artesian wells for which Letters Patent of the United States were granted me October 6, 1874, as will be hereinafter fully described.

The object of the invention is to supply a bull-wheel made in sections, so that it can be taken apart for storage or transportation, and be readily reconstructed when desired.

Referring to the accompanying drawings, Figure 1 is a perspective view of the devices composing the invention, the parts being detached and ready for shipment. Fig. 2 is a plan view of the invention, showing the wheels and shaft in position. Fig. 3 is an end view of the shaft.

In the accompanying drawings, A represents the axle, turned to a cylinder at its central parts, its ends being somewhat larger than its other portions. Thus, when the square $a$ is formed at the ends of the axle, a shoulder, $b$, is constructed on the ends of the squares nearer the center of the axle. At the outer ends of the squares $a$ the ends of the axle A may be rounded, as shown, if desired.

The wheels B are composed of the four main spokes C and an equal number of auxiliary spokes D, the spokes C being furnished at a suitable point on their faces with the grooves $d$, and arranged at right angles to each other, the inner end of each of said main spokes being placed in one of the grooves $d$. Thus, the grooves all being an equal distance from the ends of the spokes, a square aperture, $e$, is formed at the center of the wheel B. From points centrally above the aperture $e$ project the auxiliary spokes D, the inner ends of which are beveled, so as to fit close upon the spokes C, and are secured in this position by the bolts $f$, which pass at right angles to each other through the inner ends of both spokes and across the apertures $e$. In order to prevent any rattling, and to construct secure joints, the bolts $f$ are furnished with the washers $g$, the outer ends of which are flat and the inner ends inclined, so as to firmly bear against the inclined faces of the spokes D.

The outer ends of the spokes C D are grooved, as shown in Fig. 2, and have placed between them the curved sections H, which are also grooved, and represent segments of the circle described by the completed wheel. Upon each side of the outer ends of the spokes C D and sections $h$ are secured the sections $i$, which, when in position, constitute the rims of the wheel, and may be retained in proper relation to the sections $h$ by the bars $l$ passing transversely through them. If found necessary, a few bolts may be passed through the sections to more firmly adjust them.

The wheels, being now properly constructed, may, if desired, be placed upon the ends of the axle A, the aperture $e$ closely impinging the faces of the square $a$, and the inner edges of the spokes bearing firmly against the shoulder $b$.

In close proximity to the outer edges of the spokes are inserted transversely through the axle A the bolts $m$, which are supplied with the usual heads and nuts, and at each end of the bolts, between these heads and nuts and the axle A, are provided the tapered washers $n$, which, projecting beyond the edges of the square $a$, afford a means of securing the wheel upon the axle, and which, being removable, will allow the wheel to be taken off and replaced at will.

When the wheels are in position upon the shaft A, the bolts $f$, besides passing through the inner ends of the spokes C D, are inserted in suitable apertures in the square $a$, and thereby afford additional security to the wheel. At the same time they may be removed when desired.

The object of the above construction is to supply a wheel which can be taken apart for shipment and rearranged after it has reached its destination, thus saving space in the transporting-vehicle and the labor and difficulty experienced in handling the wheels now in use.

What I claim as my invention, and desire to secure by Letters Patent, is—

1. The axle A, provided with the squares $a$ and shoulders $b$, in combination with a suitable wheel and the bolts $m$ and washers $n$, substantially as set forth.

2. In a bull-wheel, the spokes C and grooved spokes D, in combination with the bolts $f$ and washers $g$, substantially as shown and described.

In testimony that I claim the foregoing improvement in bull-wheels for Artesian wells, as above described, I have hereunto set my hand this 28th day of January, 1878.

MICHAEL B. McMANUS.

Witnesses:
L. D. PHELPS,
W. H. BODEN.